(12) United States Patent
Caron et al.

(10) Patent No.: US 10,852,814 B1
(45) Date of Patent: Dec. 1, 2020

(54) BOUNDING VIRTUAL OBJECT

(71) Applicant: Microsoft Technology Licensing, LLC, Redmond, WA (US)

(72) Inventors: Jack Daniel Caron, Seattle, WA (US); Ramiro S. Torres, Seattle, WA (US); John Scott Iverson, Seattle, WA (US); Jamie Bryant Kirschenbaum, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/539,365

(22) Filed: Aug. 13, 2019

(51) Int. Cl.
*G06F 3/01* (2006.01)
*G06T 19/00* (2011.01)
*G06T 7/50* (2017.01)
*G06T 19/20* (2011.01)

(52) U.S. Cl.
CPC ............. *G06F 3/011* (2013.01); *G06F 3/017* (2013.01); *G06T 7/50* (2017.01); *G06T 19/006* (2013.01); *G06T 19/20* (2013.01); *G06T 2219/2012* (2013.01); *G06T 2219/2016* (2013.01)

(58) Field of Classification Search
CPC ........ G06F 3/017; G06F 3/011; G06T 19/006; G06T 19/20; G06T 2219/2016; G06T 7/50; G06T 2219/2012
See application file for complete search history.

(56) References Cited

U.S. PATENT DOCUMENTS

| | | | |
|---|---|---|---|
| 2017/0270715 A1* | 9/2017 | Lindsay | G06T 7/70 |
| 2018/0322701 A1* | 11/2018 | Pahud | G06F 3/017 |
| 2018/0342103 A1* | 11/2018 | Schwarz | G06F 3/017 |
| 2020/0005026 A1* | 1/2020 | Andersen | G06F 3/011 |

* cited by examiner

*Primary Examiner* — Muhammad N Edun
(74) *Attorney, Agent, or Firm* — Alleman Hall Creasman & Tuttle LLP

(57) ABSTRACT

A head-mounted display system is provided, including a head-mounted display, an imaging sensor, and a processor. The processor may convey instructions to the head-mounted display to display a virtual object at a world-locked location in a physical environment. The processor may receive imaging data of the physical environment from the imaging sensor. The processor may determine, based on the imaging data, that a world-space distance between a hand of a user and the world-locked location is below a predetermined distance threshold. The processor may convey instructions to the head-mounted display to display a bounding virtual object that covers at least a portion of the virtual object. The processor may detect, based on the imaging data, a change in the world-space distance. The processor may convey instructions to the head-mounted display to modify a visual appearance of the bounding virtual object based on the change in the world-space distance.

20 Claims, 13 Drawing Sheets

BOUNDING VIRTUAL OBJECT

BACKGROUND

In augmented reality systems, virtual objects may be displayed such that they appear to be anchored to locations in the user's surroundings. These virtual objects are frequently programmed such that they respond to interactions such as gestural inputs made by the user of the augmented reality device. For example, the user may make these gestural inputs by touching apparent positions of virtual objects.

SUMMARY

According to one aspect of the present disclosure, a head-mounted display system is provided, including a head-mounted display, an imaging sensor, and a processor. The processor may be configured to convey instructions to the head-mounted display to display a virtual object at a world-locked location in a physical environment. The processor may be further configured to receive imaging data of the physical environment from the imaging sensor. The processor may be further configured to determine, based on the imaging data, that a world-space distance between a hand of a user and the world-locked location of the virtual object is below a predetermined distance threshold. The processor may be further configured to convey instructions to the head-mounted display to display a bounding virtual object that covers at least a portion of the virtual object in a visually detectable manner. The processor may be further configured to detect, based on the imaging data, a change in the world-space distance. The processor may be further configured to convey instructions to the head-mounted display to modify a visual appearance of the bounding virtual object based on the change in the world-space distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When an augmented reality system is configured to track the position of a user's hands or fingers in order to determine when the user is interacting with a virtual object, it may sometimes be difficult for the user to tell when the user's hand is close to a virtual object. This difficulty may lead the user to enter unintentional inputs or fail to enter intended inputs when interacting with virtual objects via hand or finger tracking. The aforementioned issues are especially likely to occur when the augmented reality system is used by an inexperienced user. In addition, when the augmented reality system is not configured to provide haptic feedback to the user's hands, the lack of haptic feedback may also make it more difficult for the user to detect when the user's hand is close to a virtual object.

Figure 1:
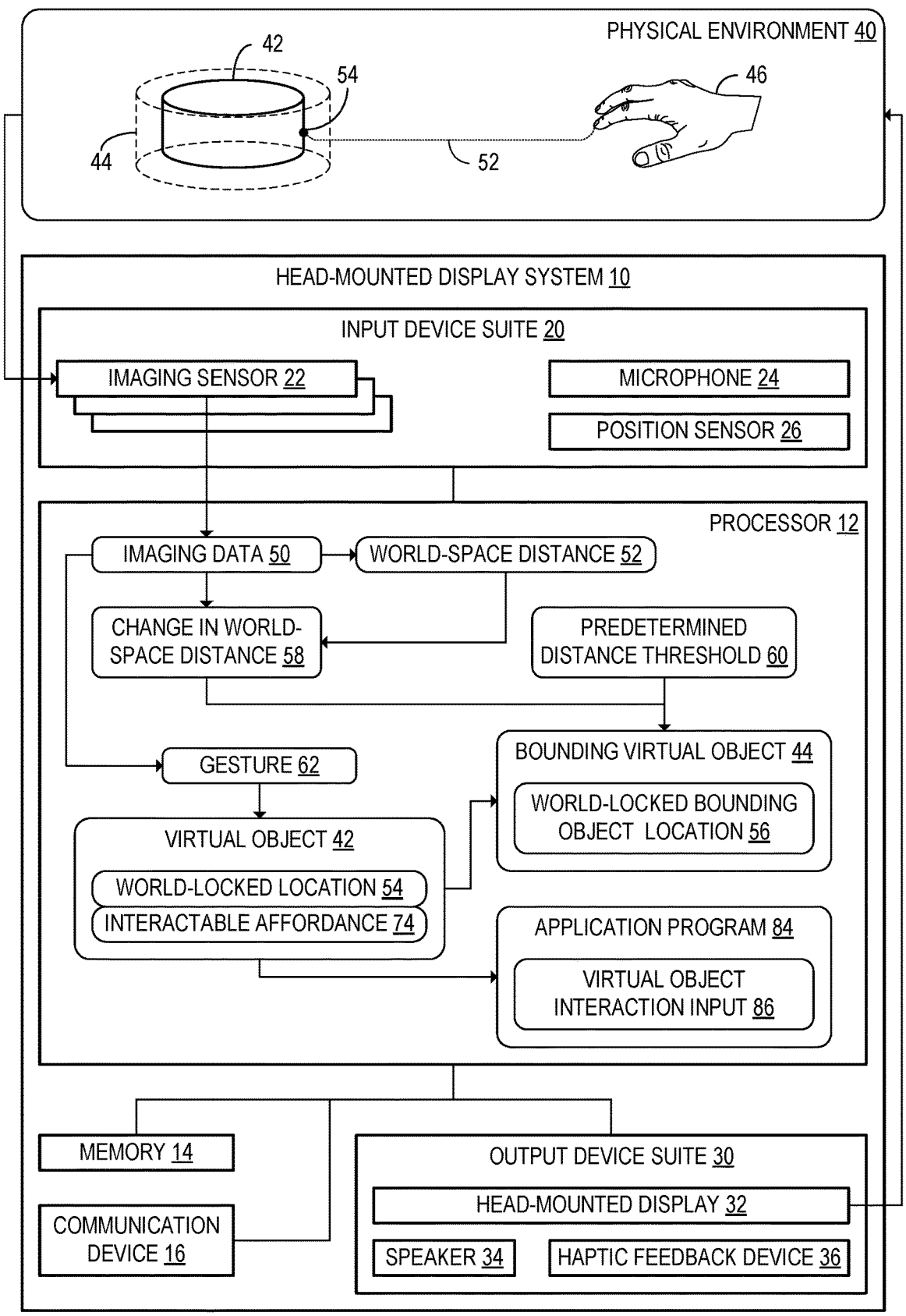
FIG. 1 schematically shows an example head-mounted display system, according to one embodiment of the present disclosure.

In order to address the above challenges, a head-mounted display system 10 is provided, as schematically shown in FIG. 1. The head-mounted display system of FIG. 1 may include a processor 12 and may further include memory 14 operatively coupled to the processor 12. The memory 14 may include volatile memory and/or non-volatile memory.

The head-mounted display system 10 may further include an input device suite 20 and an output device suite 30, each of which may be operatively coupled to the processor 12 and/or the memory 14. The input device suite 20 may include one or more imaging sensors 22, one or more microphones 24, and/or one or more position sensors 26. The one or more position sensors 26 may be head-mounted or may additionally or alternatively be mounted on a hand or other body part of the user. The input device suite 20 may further include one or more other input devices not shown in FIG. 1, such as one or more of a button, a mouse, a control stick, a touch-sensitive surface, or some other input device. The input devices included in the input device suite 20 may be configured to collect input data from a physical environment 40 and transmit that input data to the processor 12.

The output device suite 30 of the head-mounted display system may include a head-mounted display 32. One or more virtual objects 42 may be displayed to the user via the head-mounted display 32. This head-mounted display 32 may be configured in an augmented-reality mode or a virtual-reality mode, as discussed in further detail below. The output device suite 30 may further include one or more speakers 34, one or more haptic feedback devices 36, and/or one or more other output devices. Each output device included in the output device suite 30 may be configured to receive instructions (e.g., in the form of electrical signals) from the processor 12 to produce output.

In some embodiments, the head-mounted display system 10 may be configured as a single physical device. In other embodiments, the components of head-mounted display system 10 may be divided between a plurality of communicatively coupled physical devices. The head-mounted display system 10 may include one or more communication devices 16 via which separate physical devices may be communicatively coupled. For example, in some embodiments, some or all of the input devices included in the input device suite 20 and/or the output devices included in the output device suite 30 may be included in a head-mounted display device that may be worn by the user and may communicate with an offboard computing device included in the head-mounted display system 10. In such embodiments, the offboard computing device may be configured to receive input data from the input device suite 20, process the input data at a processor 12, and convey output data to the output device suite 30. Additionally or alternatively, the head-mounted display system 10 may include a server computing device with which the head-mounted display device and/or the offboard computing device communicates over a network.

Figure 2:
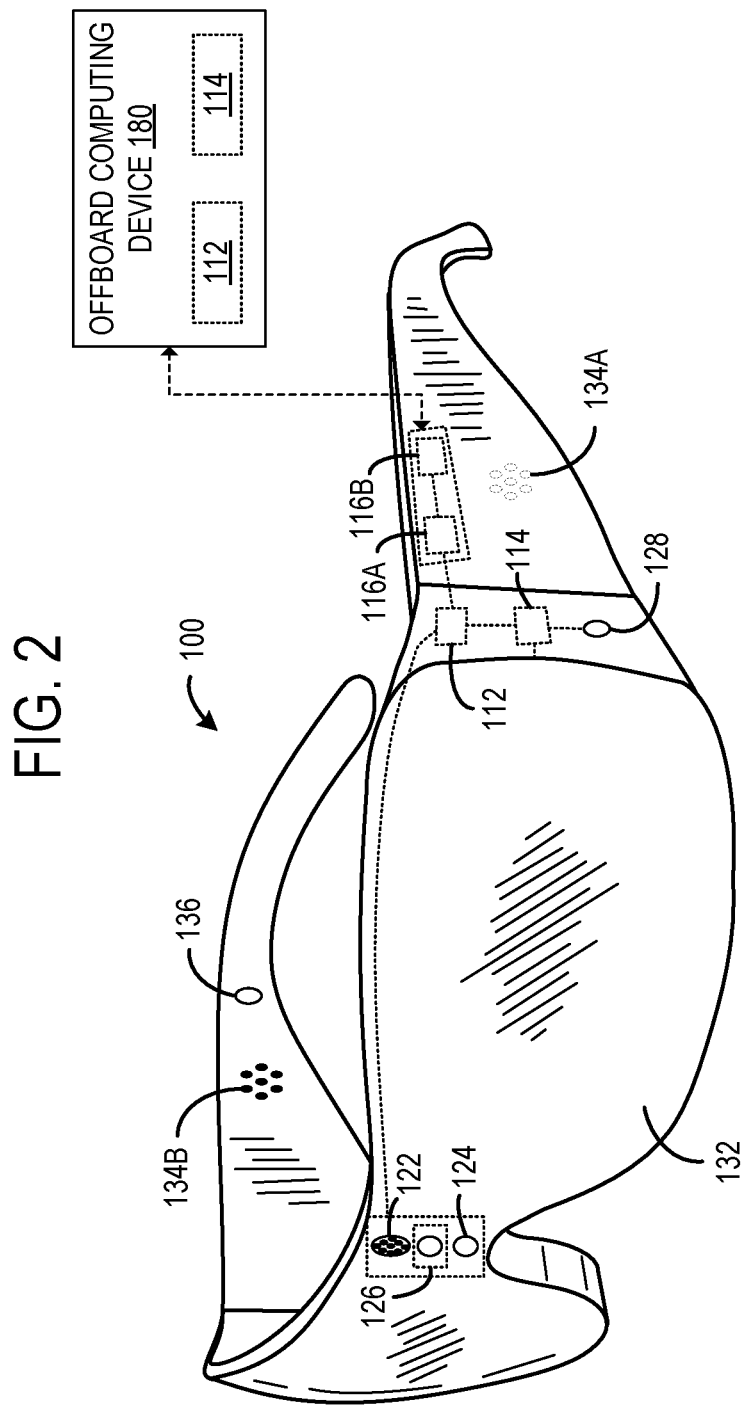
FIG. 2 shows an example head-mounted display device, according to the embodiment of FIG. 1.

An example of a head-mounted display device 100 is shown in FIG. 2. The head-mounted display device 100 of FIG. 2 has the form of wearable glasses or goggles, but it will be appreciated that other forms are possible. The head-mounted display device 100 may include an output device suite including a display 132. In some embodiments, the head-mounted display device 100 may be configured in an augmented reality configuration to present an augmented reality environment, and thus the display 132 may be an at least partially see-through stereoscopic display configured to visually augment an appearance of a physical environment being viewed by the user through the display 120. In some examples, the display 120 may include one or more regions that are transparent (e.g. optically clear) and may include one or more regions that are opaque or semi-transparent. In other examples, the display 120 may be transparent (e.g. optically clear) across an entire usable display surface of the display 120.

The head-mounted display device 100 may include a processor 112 and/or memory 114. Alternatively, the processor 112 and/or the memory 114 of the head-mounted display device 100 may be instantiated in one or more offboard computing devices 180 with which the head-mounted display device 100 is configured to communicate. Alternatively, one or more other local and/or remote computing devices may perform some or all of the functions of the processor 112 and/or memory 114. The head-mounted display device 100 may further include a communication system including one or more communication devices, which may include one or more receivers 116A and/or one or more transmitters 116B. In embodiments in which the head-mounted display device 100 communicates with an offboard computing device 180, the one or more receivers 116A may be configured to receive data from the offboard computing device 180, and the one or more transmitters 116B may be configured to send data to the offboard computing device 180. In some embodiments, the head-mounted display device 100 may communicate with the offboard computing device 180 via a network, which may be a wireless local- or wide-area network. Additionally or alternatively, the head-mounted display device 100 may communicate with the offboard computing device 180 via a wired connection.

The output device suite 30 of the head-mounted display device 100 may, for example, include an image production system that is configured to display one or more virtual objects 42 to the user with the display 132. The processor 112 may be configured to output for display on the display 132 a mixed reality experience including one or more virtual objects 42 superimposed upon the physical environment 40. In the augmented reality configuration with an at least partially see-through display, the virtual objects 42 are visually superimposed onto the physical environment 40 that is visible through the display 132 so as to be perceived at various depths and locations. In one embodiment, the head-mounted display device 100 may use stereoscopy to visually place a virtual object 42 at a desired depth by displaying separate images of the virtual object 42 to both of the user's eyes such that the user will perceive that the virtual objects 42 exist at a desired depth and location in the viewed physical environment 40. When the head-mounted display device 100 is in the augmented reality configuration, the processor 12 may be configured to convey instructions to the display 132 to display a virtual object 42 at a world-locked location 54 in the physical environment 40. The location of the virtual object 42 may be world-locked by maintaining an apparent position of the virtual object 42 in the physical environment 40 that is substantially conserved under changes in the user's viewing distance and perspective.

Alternatively, the head-mounted display device 100 may be configured in a virtual reality configuration to present a full virtual reality environment, and thus the display 132 may be a non-see-though stereoscopic display. The head-mounted display device 100 may be configured to display virtual three-dimensional environments to the user via the non-see-through stereoscopic display. The head-mounted display device 100 may be configured to display a virtual representation such as a three-dimensional graphical rendering of the physical environment in front of the user that may include additional virtual objects 42. Displaying the virtual representation of the physical environment may include generating a two-dimensional projection of a three-dimensional model of the physical environment onto the surface of the display 132.

The output device suite 30 of the head-mounted display device 100 may further include one or more speakers configured to emit sound. In some embodiments, the head-mounted display device 100 may include at least a left speaker 134A and a right speaker 134B situated such that the left speaker 134A may be located proximate the user's left ear and the right speaker 134B may be located proximate the user's right ear when the head-mounted display device 100 is worn. Thus, the left speaker 134A and the right speaker 134B may emit stereo sound output. The output device suite 30 may further include one or more haptic feedback devices 136 configured to provide tactile output (e.g., vibration).

The head-mounted display device 100 may include an input device suite 20 including one or more input devices. The input device suite 20 of the head-mounted display device 100 may include one or more optical sensors. In one example, the input device suite 20 includes an outward-facing optical sensor 122 that may be configured to detect the real-world background from a similar vantage point (e.g., line of sight) as observed by the user through the display 132 in an augmented reality configuration. The input device suite 20 may additionally include an inward-facing optical sensor 124 that may be configured to detect a gaze direction of the user's eyes. It will be appreciated that the outward-facing optical sensor 122 and/or the inward-facing optical sensor 124 may include one or more component sensors, including a visible light camera and/or a depth camera. Depth data captured by the depth camera may be combined with color information captured by the visible light camera into a single image representation including both color data and depth data, in some embodiments.

The input device suite 20 of the head-mounted display device 100 may further include a position sensor system that may include one or more position sensors 126 such as accelerometer(s), gyroscope(s), magnetometer(s), global positioning system(s), multilateration tracker(s), and/or other sensors that output position data as a position, orientation, and/or movement of the relevant sensor. The input device suite 20 may further include one or more microphones 128 configured to collect sound data.

Optical sensor information received from the one or more optical sensors and/or position data received from position sensors 126 may be used to assess a position and orientation of the vantage point of head-mounted display device 100 relative to other environmental objects. For example, the position and orientation of the vantage point may be determined using simultaneous localization and mapping (SLAM). In some embodiments, the position and orientation of the vantage point may be characterized with six degrees of freedom (e.g., world-space X, Y, Z, pitch, roll, yaw). The position and/or orientation may be determined by the processor 112 of the head-mounted display device 100 and/or the offboard computing device 180.

Furthermore, the optical sensor information and the position sensor information may be used by the head-mounted display system 10 to perform analysis of the physical environment 40, such as depth analysis, surface reconstruction, environmental color and lighting analysis, or other suitable operations. In particular, the optical and positional sensor information may be used to create a virtual model of the physical environment 40. Moreover, the virtual model may be used to determine respective world-locked locations 54 of virtual objects 42 in the virtual space and add additional virtual objects 42 to be displayed to the user at a desired depth and location. Additionally, the optical sensor information received from the one or more optical sensors may be used to identify and track objects in the field of view of the one or more optical sensors. The optical sensors may also be used to identify machine recognizable visual features in the physical environment 40 and use the relative movement of those features in successive frames to compute a frame-to-frame relative pose change for the head-mounted display device 100 within the world space of the virtual model.

Returning to FIG. 1, the processor 12 of the head-mounted display system 10 may be further configured to receive imaging data 50 of the physical environment from the one or more imaging sensors 22, as discussed above. The processor 12 may be further configured to determine a world-space distance 52 between a hand 46 of the user and the world-locked location 54 of the virtual object 42. For example, in embodiments in which the one or more imaging sensors 22 include a depth camera, the processor 12 may receive imaging data 50 from the depth camera that indicates a plurality of respective depths between the depth camera and a plurality of points in the physical environment 40. The processor 12 may then determine that the plurality of respective depths include a pattern corresponding to all or part of the hand 46 of the user. For example, this pattern may be detected using a machine learning algorithm executed by the processor 12. The processor 12 may be further configured to associate spatial coordinates in the physical environment 40 with the detected hand 46 of the user. The world-space distance 52 may then be computed from the spatial coordinates of the hand 46 and the world-locked location 54 of the virtual object 42.

Although the imaging data 50 is described as having been collected via a depth camera in the above example, the world-space position of the hand 46 may additionally or alternatively be detected based on imaging data 50 received from one or more visible light cameras and/or other imaging sensors 22. Additionally or alternatively, in embodiments in which the input device suite 20 includes a hand-mounted position sensor 26, the position of the hand 46 may be determined from hand position sensor data received by the processor 12 from the hand-mounted position sensor 26.

Figure 3:
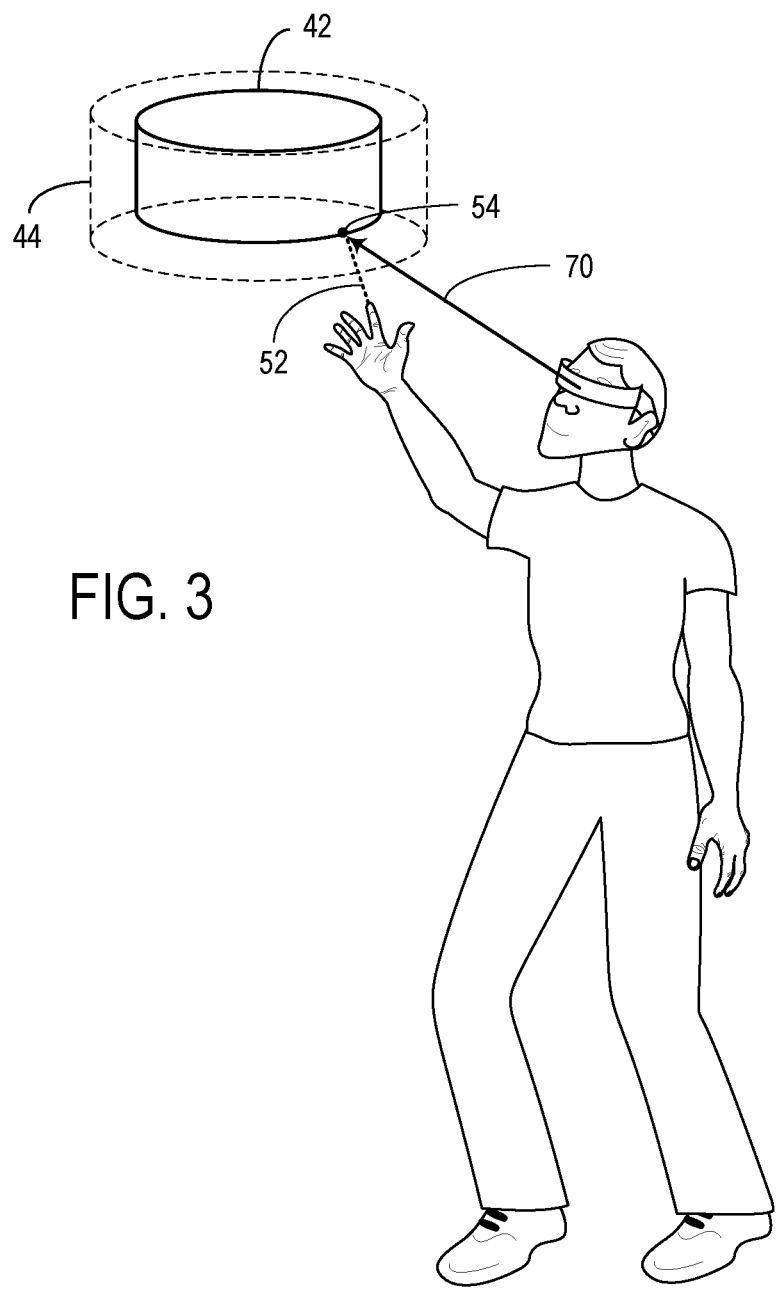
FIG. 3 shows a user viewing an example virtual object and bounding virtual object, according to the embodiment of FIG. 1.

In some embodiments, the processor 12 may be further configured to determine a line of sight 70 of the user, as shown in the example of FIG. 3. The processor 12 may be configured to determine the line of sight 70 from imaging data 50 collected by an inward-facing optical sensor 124, as described above with reference to FIG. 2.

The processor 12 may be further configured to determine that the world-space distance 52 between the hand 46 and the world-locked location 54 of the virtual object 42 is below a predetermined distance threshold 60. When the world-space distance 52 is below the predetermined distance threshold 60, the processor 12 may be further configured to convey instructions to the head-mounted display 32 to display a bounding virtual object 44. The bounding virtual object 44 may be displayed at a world-locked bounding object location 56 in the physical environment 40. Thus, the bounding virtual object 44 may be displayed such that the apparent location of the bounding virtual object 44 appears to be fixed when the user's viewing perspective changes. In embodiments in which the virtual object 42 moves through the physical environment 40, the bounding virtual object 44 may move to follow the movements of the virtual object 42.

The bounding virtual object 44 may cover at least a portion of the virtual object 42 in a visually detectable manner. For example, the bounding virtual object 44 may cover at least a portion of the virtual object 42 by being displayed between the user and at least a portion of the virtual object 42 along the user's line of sight 70, as shown in FIG. 3. In embodiments in which the processor 12 is configured to determine a line of sight 70 of the user, the processor 12 may be further configured to set the world-locked bounding object location 56 such that the bounding virtual object 44 lies along the line of sight 70. In other embodiments, the bounding virtual object 44 may entirely surround the virtual object 42.

The bounding virtual object 44 may appear to be opaque or translucent and may hide or change the appearance of the portion of the virtual object 42 which it covers. For example, when the bounding virtual object 44 is translucent, the portion of the virtual object 42 that is covered by the bounding virtual object 44 may appear to be blurred or changed in color.

The processor 12 may be further configured to detect, based on the imaging data 50, a change in the world-space distance 58 between the hand 46 and the virtual object 42. In response to this detection, the processor 12 may be further configured to convey instructions to the head-mounted display 32 to modify a visual appearance of the bounding virtual object 44 based on the change in the world-space distance 58. For example, the processor 12 may be configured to modify the visual appearance of the bounding virtual object 44 at least in part by modifying one or more of a color, an opacity, a brightness, or a size of the bounding virtual object 44.

FIGS. 4A-4E show an example of changes in the visual appearance of the bounding virtual object 44 that may occur as the user's hand 46 moves closer to the virtual object 42.

Figure 4A:
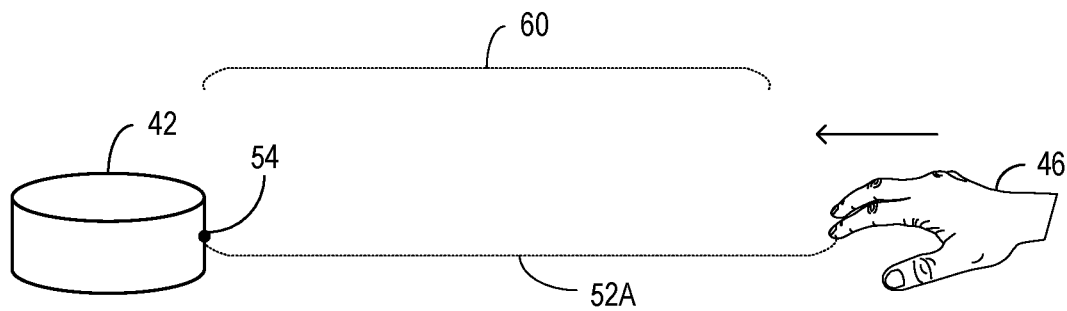
FIGS. 4A-4E show an example virtual object and bounding virtual object as a world-space distance between the virtual object and a hand of a user decreases, according to the embodiment of FIG. 1.
Figure 4B:
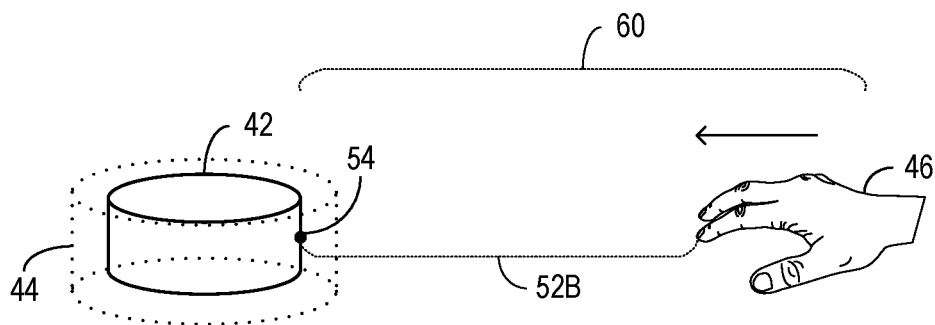

In FIG. 4A, a first world-space distance 52A between the hand 46 and the world-locked location 54 of the virtual object 42 is greater than the predetermined distance threshold 60. Thus, the bounding virtual object 44 is not displayed covering the virtual object 42. In FIG. 4B, the hand 46 has moved such that a second world-space distance 52B between the hand 46 and the virtual object 42 is less than the predetermined distance threshold 60. A bounding virtual object 44 is displayed covering the virtual object 42 in FIG. 4B.

Figure 4C:
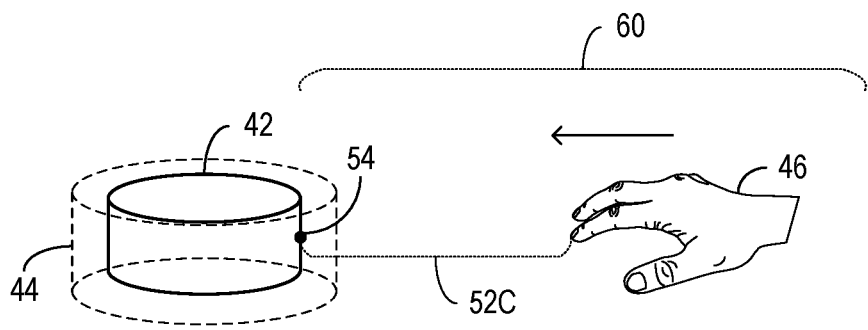

In some embodiments, the processor 12 may be configured to modify the visual appearance of the bounding virtual object 44 to be more visually prominent in response to a decrease in the world-space distance 52. Modifying the visual appearance of the bounding virtual object 44 to be more visually prominent may, for example, include increasing the brightness and/or the opacity of the bounding virtual object 44. FIG. 4C shows that the bounding virtual object 44 has increased in visual prominence in response to a detection that the hand 46 has moved to a third world-space distance 52C from the virtual object 42 that is shorter than the second world-space distance 52B shown in FIG. 4B. Modifications made to the visual appearance of the bounding virtual object 44 as the world-space distance 52 decreases may be discrete or continuous as a function of the world-space distance 52. When the modifications to the visual appearance of the bounding virtual object 44 are discrete, the processor 12 may be further configured to detect that the world-space distance 52 is below one or more additional distance thresholds at which the processor 12 is configured to modify the visual appearance of the bounding virtual object 44.

Figure 4D:
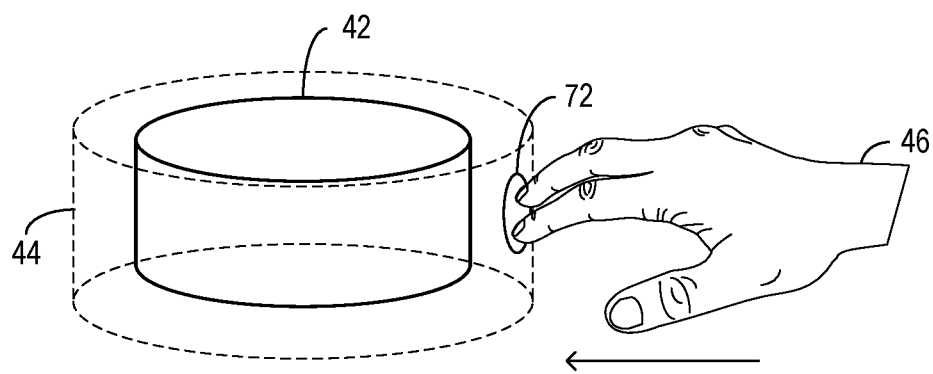

In some embodiments the processor 12 may be further configured to detect, based on the imaging data 50, that the hand 46 of the user intersects the bounding virtual object 44. In response to this determination, the processor 12 may be further configured to modify the visual appearance of the bounding virtual object 44 in response to the detection that the hand 46 of the user intersects the bounding virtual object 44. In FIG. 4D, the bounding virtual object 44 intersects the hand 46. A hand contact indicator 72 is displayed on the surface of the bounding virtual object 44. The hand contact indicator 72 may show an area or volume of the bounding virtual object 44 that intersects the hand 46. As shown in FIG. 4D, the hand contact indicator 72 is visually distinguishable from other regions of the bounding virtual object 44.

Figure 4E:
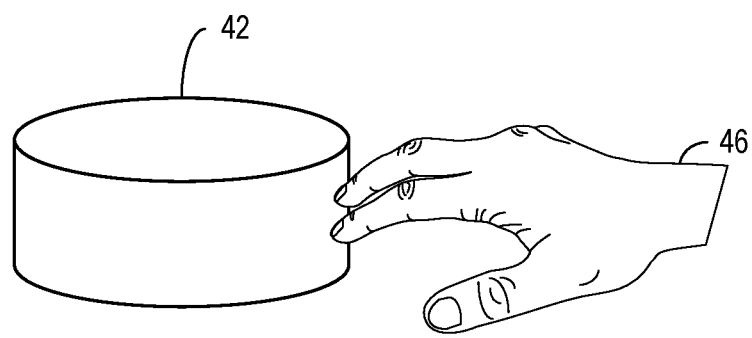

The processor 12 may be further configured to detect, based on the imaging data 50, that the hand 46 of the user intersects the virtual object 42. Subsequently to detecting that the hand 46 intersects the virtual object 42, the processor 12 may be further configured to modify the visual appearance of the bounding virtual object 44. In some embodiments, as shown in FIG. 4E, the processor 12 may be configured to hide the bounding virtual object 44 in response to detecting that the hand 46 of the user intersects the bounding virtual object 44. However, the bounding virtual object 44 may remain visible in other embodiments.

Figure 5A:
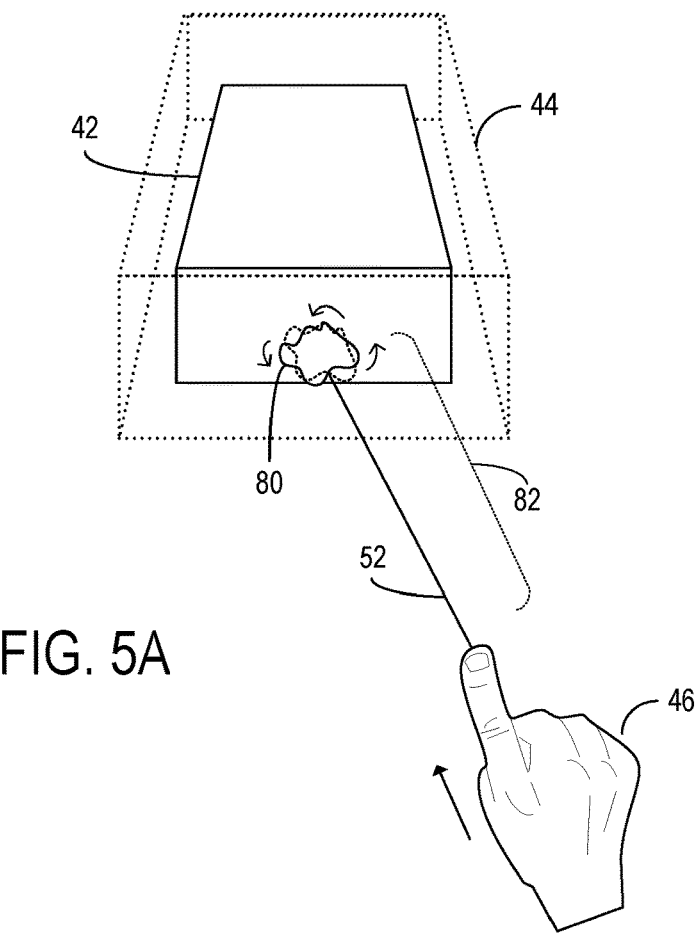
FIGS. 5A-5B show an example bounding virtual object including an animated graphical element, according to the embodiment of FIG. 1.
Figure 5B:
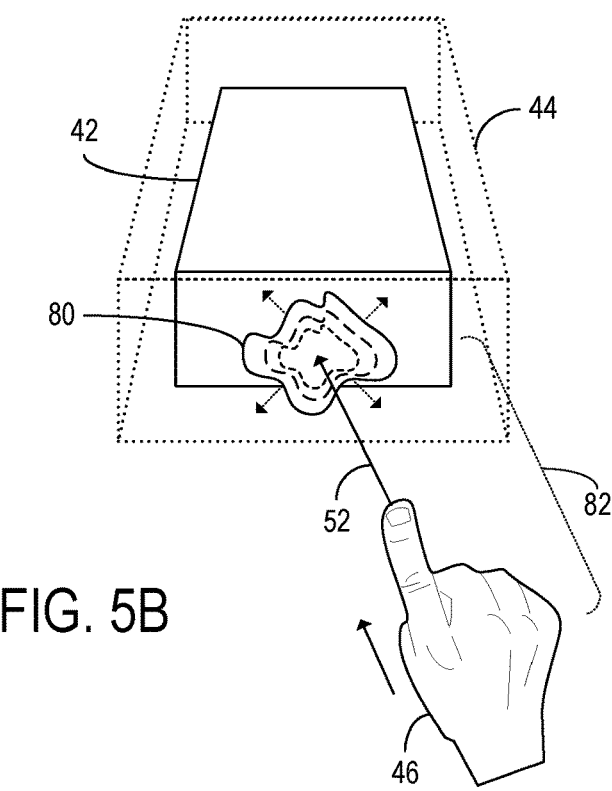

In some embodiments, as shown in FIGS. 5A-5B, an animated graphical element 80 may be displayed on the bounding virtual object 44. The animated graphical element 80 may be configured to change in visual appearance as time elapses even when the world-space distance 52 between the hand 46 and the virtual object 42 does not change. For example, the animated graphical element 80 may include a temporally ordered sequence of frames. In the example of FIG. 5A, the animated graphical element 80 rotates over time.

The animated graphical element 80 may be modified in a visually identifiable manner based on the change in the world-space distance 58. In the example of FIG. 5A, the animated graphical element 80 is shown having an initial visual appearance when the hand 46 is further than an additional threshold distance 82 from the virtual object 42. When the hand 46 moves to within the additional threshold distance 82 as shown in FIG. 5B, the animated graphical element 80 increases in size. Thus, the animation associated with the animated graphical element 80 is modified when the hand 46 moves to within the additional threshold distance 82.

Although, in the example of FIGS. 5A-5B, the animated graphical element 80 is increased in size in response to the processor 12 detecting the change in the world-space distance 58, other modifications to the animated graphical element 80 may be made in other embodiments. For example, a color, an opacity, or a brightness, of the animated graphical element 80 may be modified. Additionally or alternatively, the modification to the animated graphical element 80 may pause or unpause the animated graphical element 80 or make some other change to the framerate of the animated graphical element 80.

Figure 6A:
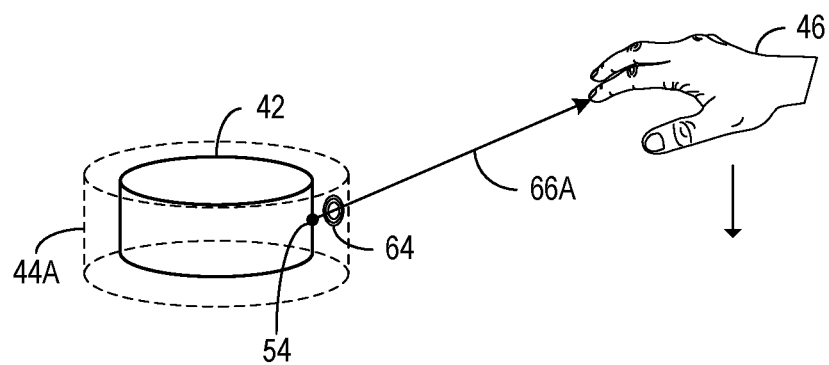
FIGS. 6A-6B show an example bounding virtual object that visually indicates a direction toward the hand of the user, according to the embodiment of FIG. 1.
Figure 6B:
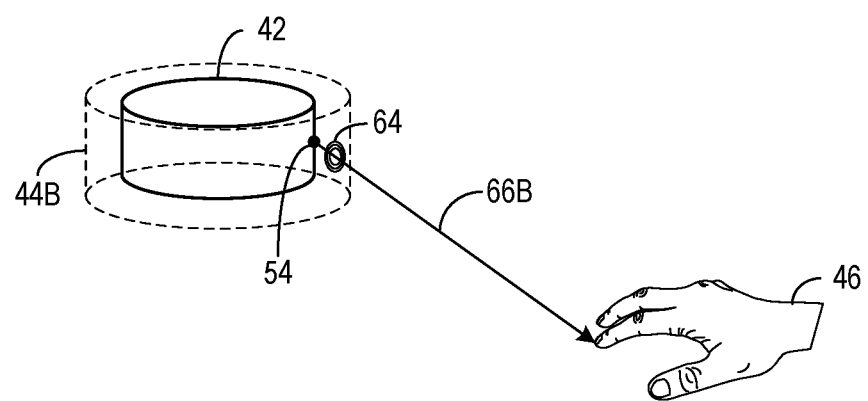

In some embodiments, as shown in the example of FIGS. 6A-6B, the bounding virtual object 44 may visually indicate a direction from the virtual object 42 toward the hand 46 of the user. In FIG. 6A, a first direction 66A from the world-locked location 54 of the virtual object 42 to the hand 46 is indicated on the bounding virtual object 44 by a direction indicator 64. As shown in FIG. 6B, when the hand 46 moves in a direction with a nonzero component perpendicular to the first direction 66A, the processor 12 may be further configured to modify the direction indicator 64 to show a second direction 66B from the world-locked location 54 of the virtual object 42 to the new location of the hand 46. In the example of FIG. 6B, the direction indicator 64 moves downward along the surface of the bounding virtual object 44 in response to a determination that the hand 46 has moved downward in the physical environment 40. In other example embodiments, the direction indicator 64 may be displayed as a shadow or reflection of at least a portion of the user's hand 46 on the surface of the bounding virtual object 44.

The virtual object 42 may, in some embodiments, include one or more interactable affordances 74. The one or more interactable affordances 74 may respectively be associated with one or more application programs 84 for which the one or more interactable affordances 74 may be configured to provide user input. The processor 12 may be further configured to detect, based on the imaging data, a gesture 62 of the hand 46 of the user that intersects the interactable affordance 74. In response to detecting the gesture 62 that intersects the interactable affordance 74, the processor 12 may be further configured to convey a virtual object interaction input 86 to an application program 84.

Figure 7A:
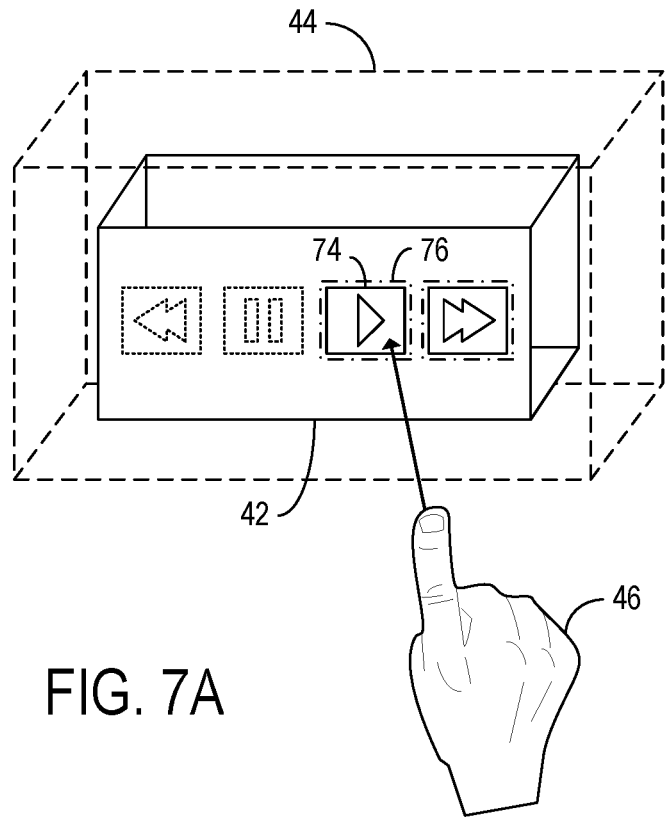
FIGS. 7A-7B show an example bounding virtual object on which an interactable affordance of a virtual object is indicated, according to the embodiment of FIG. 1.
Figure 7B:
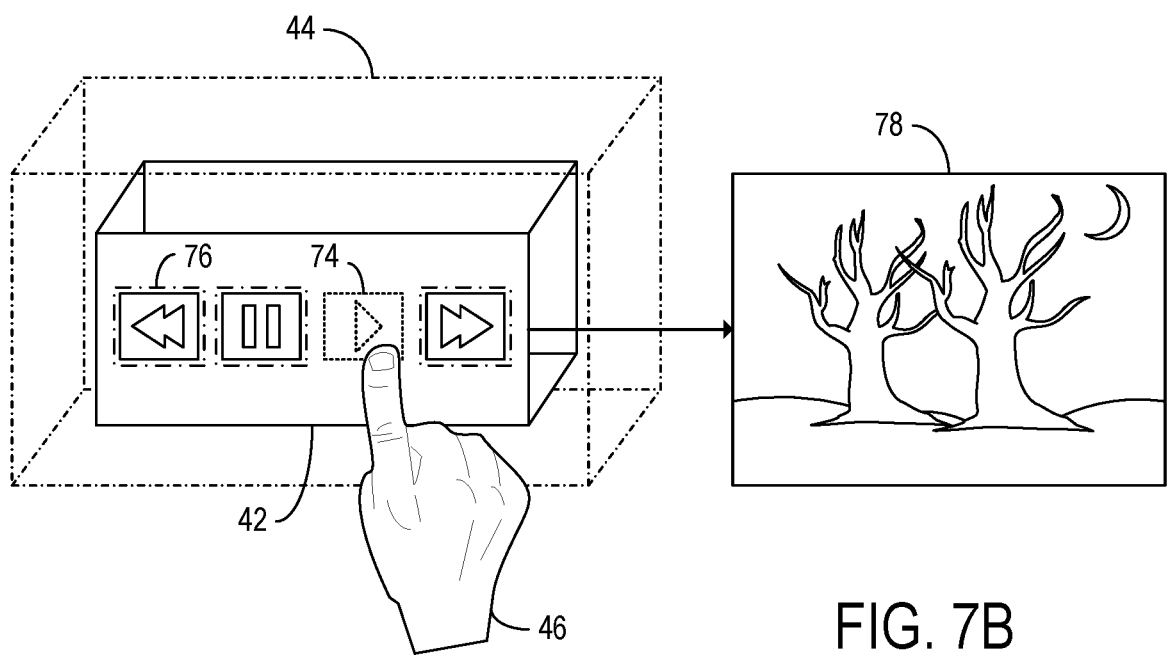

As shown in the example of FIGS. 7A-7B, the interactable affordance 74 of the virtual object 42 may be indicated on the bounding virtual object 44 in a visually detectable manner. In the example of FIGS. 7A-7B, the virtual object 42 is a video menu virtual object including interactable affordances 74 that function as a rewind button, a pause button, a play button, and a fast-forward button. These interactable affordances 74 may each be associated with a video player application program 84. In the example of FIGS. 7A-7B, each of the buttons that is currently interactable is indicated by an interactable affordance indicator 76 on the bounding virtual object 44, displayed here as a border. Each button that is not currently available as an interactable affordance 74 is displayed without an associated interactable affordance indicator 76. In FIG. 7A, the video player application has not yet started playing a video. Interactable affordance indicators 76 are displayed for the play button and the fast-forward button respectively, but not displayed for the rewind button and the pause button.

FIG. 7B shows the virtual object 42 and bounding virtual object 44 of FIG. 7A after the user has selected the play button. In response to the selection of the play button, the video player application program 84 may convey instructions to output a video virtual object 78 for display on the head-mounted display 32. The processor 12 may be further configured to output instructions to display respective interactable affordance indicators 76 for the rewind button, the pause button, and the fast-forward button and hide the interactable affordance indicator 76 for the play button. Thus, the respective interactable affordances may show, on the bounding virtual object 44, where one or more interactable affordances 74 are located on the virtual object 42.

Figure 8A:
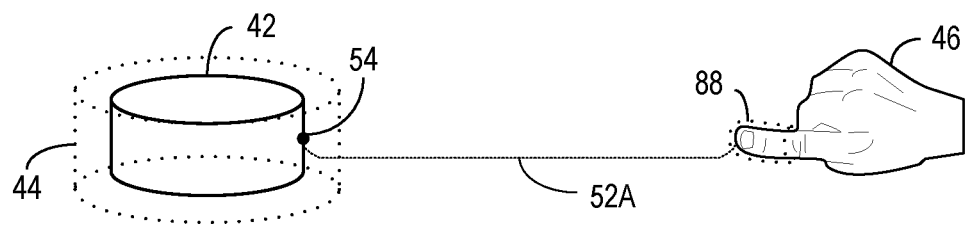
FIGS. 8A-8B show an example hand bounding virtual object, according to the embodiment of FIG. 1.
Figure 8B:
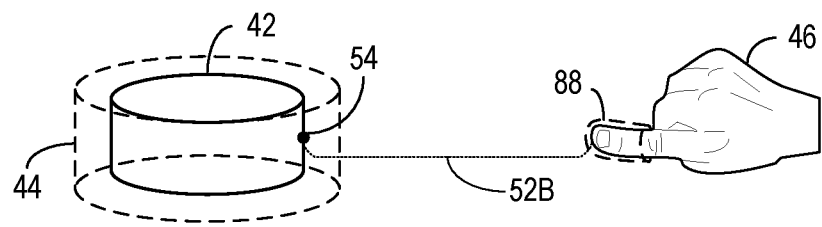

As shown in the example of FIGS. 8A-8B, the processor 12 may be further configured to convey instructions to the head-mounted display 32 to display a hand bounding virtual object 88 that covers at least a portion of the hand 46 of the user. In the example of FIGS. 8A-8B, the hand bounding virtual object 88 is displayed around the user's index finger. As the user's hand 46 moves, the hand bounding virtual object 88 may move to move to follow the movement of the user's hand 46. In addition, the processor 12 may be further configured to modify the visual appearance of the hand bounding virtual object 88 as the world-space distance 52 between the hand 46 and the virtual object 42 changes. In FIG. 8A, the hand 46 is located at a first world-space distance 52A from the virtual object 42, and in FIG. 8B, the hand 46 has moved such that it is located at a second world-space distance 52B from the virtual object 42. The second world-space distance 52B is shorter than the first world-space distance 52A in the example of FIGS. 8A-8B. In response to detecting this change in the world-space distance 58, the processor 12 may modify the visual appearance of the hand bounding virtual object 88 to be more visually prominent, as shown in FIG. 8B.

Figure 9A:
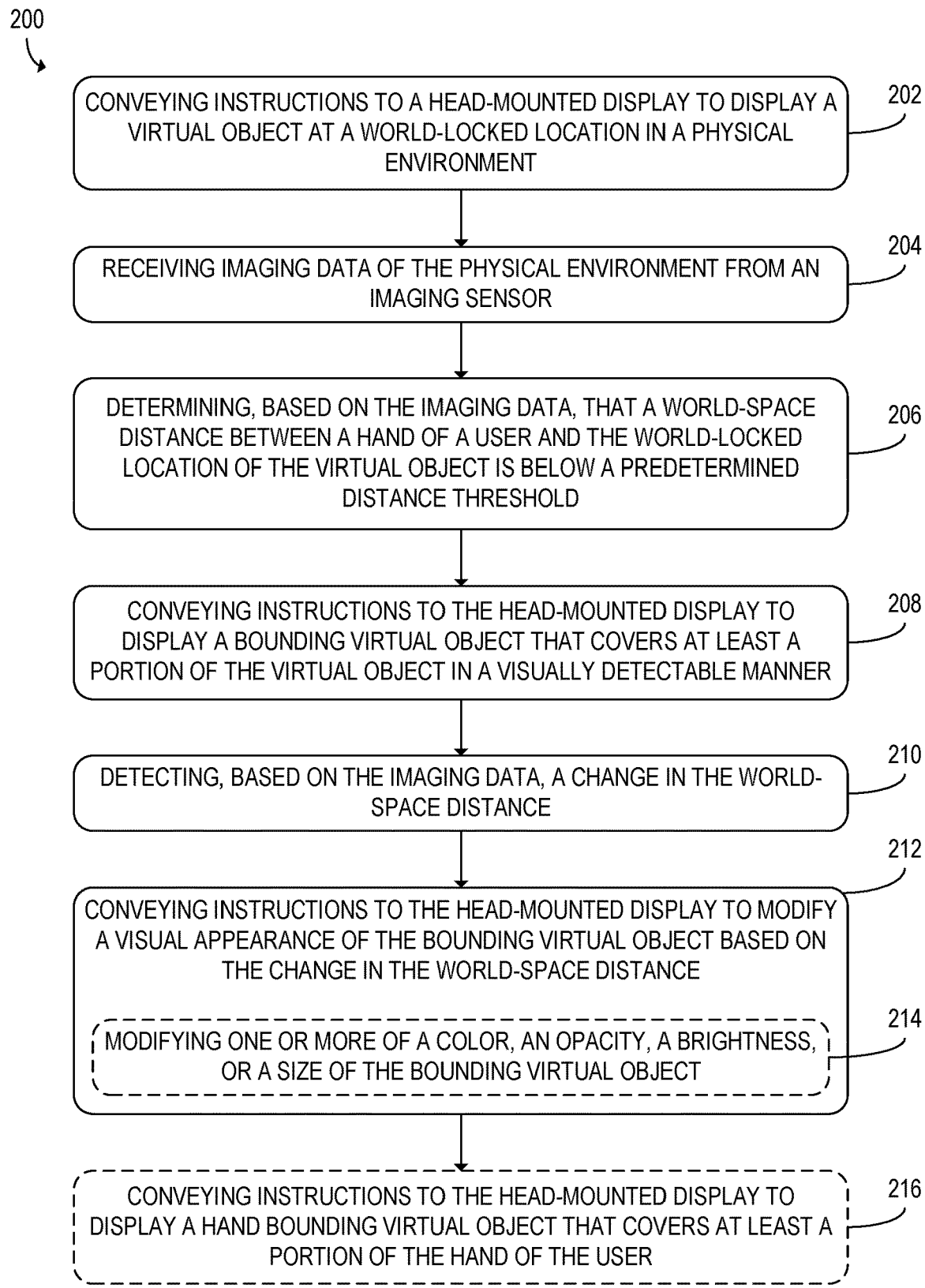
FIG. 9A shows a flowchart of an example method that may be used with a head-mounted display system, according to the embodiment of FIG. 1.

FIG. 9A shows a flowchart of method 200 for use with a head-mounted display system. The method 200 may be used with the head-mounted display system 10 of FIG. 1 or with some other head-mounted display system. At step 202, the method 200 may include conveying instructions to a head-mounted display to display a virtual object at a world-locked location in a physical environment. The instructions may be conveyed to the head-mounted display from a processor included in the head-mounted display system and may be conveyed as electrical signals. The virtual object may be displayed on the head-mounted display so as to appear to be superimposed upon the physical environment at the world-locked location.

At step 204, the method 200 may further include receiving imaging data of the physical environment from an imaging sensor. The imaging sensor may be a depth camera, a visible light camera, or some other type of imaging sensor. The head-mounted display system may include a plurality of imaging sensors configured to collect the imaging data. For example, the head-mounted display system may include one or more outward-facing optical sensors and one or more inward-facing optical sensors provided in a head-mounted display device.

At step 206, the method 200 may further include determining, based on the imaging data, that a world-space distance between a hand of a user and the world-locked location of the virtual object is below a predetermined distance threshold. In some embodiments, the position of the hand of the user may be determined by applying an object-recognition machine learning algorithm to the imaging data. In other embodiments, the position of the hand may be determined from hand position sensor data received from a hand-mounted position sensor. The world-space distance may then be obtained from the hand position and the world-locked location of the virtual object and may be compared to the predetermined distance threshold.

When the world-space distance is below the predetermined distance threshold, the method 200 may further include, at step 208, conveying instructions to the head-mounted display to display a bounding virtual object. The bounding virtual object may cover at least a portion of the virtual object in a visually detectable manner. For example, the bounding virtual object may be an opaque or translucent virtual object that hides or changes the appearance of a portion of the virtual object facing the user.

At step 210, the method 200 may further include detecting, based on the imaging data, a change in the world-space distance. This change in the world-space distance may be a result of movement of the hand and/or the virtual object. Movement of the hand in a direction perpendicular to the direction of the world-space distance may additionally be detected. In response to the detection of the change in the world-space distance, the method 200 may further include, at step 212, conveying instructions to the head-mounted display to modify a visual appearance of the bounding virtual object based on the change in the world-space distance. In some embodiments, modifying the visual appearance of the bounding virtual object may include, at step 214, modifying one or more of a color, an opacity, a brightness, or a size of the bounding virtual object. For example, the visual appearance of the bounding virtual object may be modified to be more visually prominent in response to a decrease in the world-space distance.

In some embodiments, the method 200 may further include, at step 216, conveying instructions to the head-mounted display to display a hand bounding virtual object that covers at least a portion of the hand of the user. For example, the bounding virtual object may be displayed to cover one or more fingers or the entire hand. Similarly to the visual appearance of the bounding virtual object, the visual appearance of the hand bounding virtual object may be modified in response to changes in the world-space distance between the hand and the virtual object.

In some embodiments, the bounding virtual object may visually indicate a direction from the virtual object toward the hand of the user. For example, in embodiments in which movement of the hand in a direction perpendicular to the direction of the world-space distance is detected, the visual appearance of the bounding virtual object may be modified to show this movement.

Figure 9B:
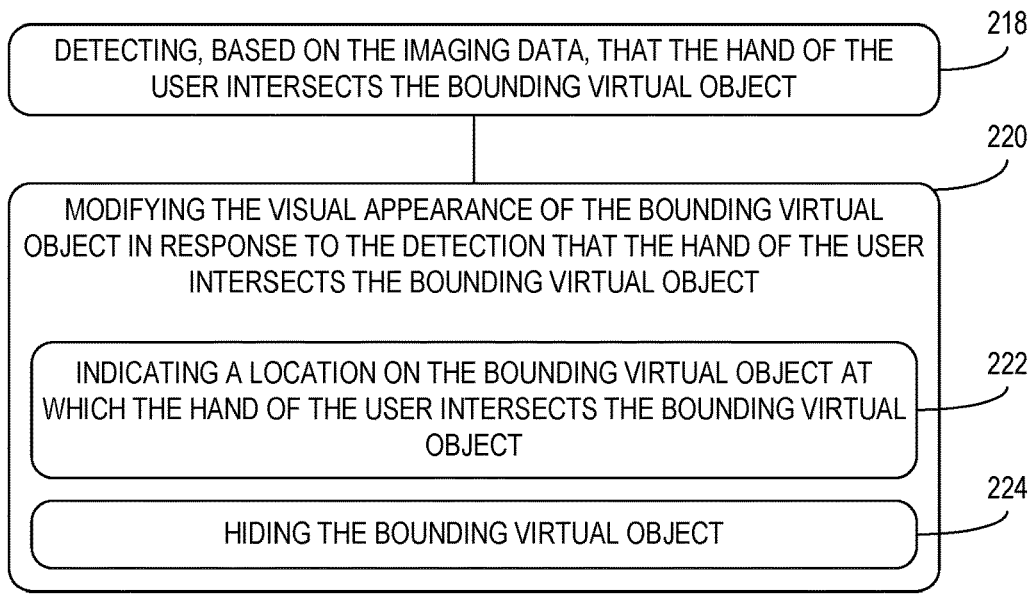
FIGS. 9B-9D show additional steps of the method of FIG. 9A that may be performed in some embodiments.
Figure 9C:
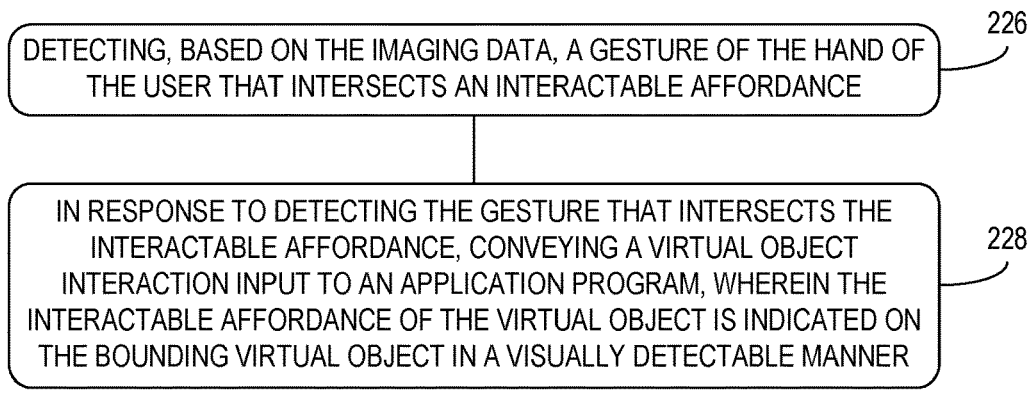
Figure 9D:
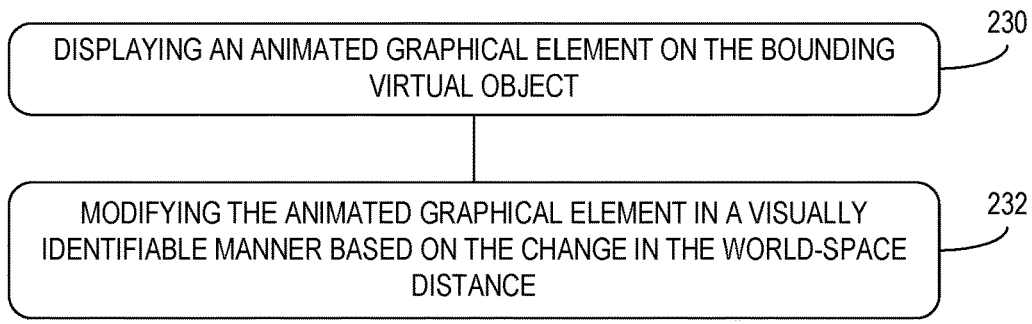

FIGS. 9B-9D show additional steps that may be performed in some embodiments when performing the method 200 of FIG. 9A. As shown in FIG. 9B, the method 200 may further include, at step 218, detecting that the hand of the user intersects the bounding virtual object. This detection may be made based on the imaging data. At step 220, the method 200 may further include modifying the visual appearance of the bounding virtual object in response to the detection that the hand of the user intersects the bounding virtual object. In some embodiments, step 220 may include, at step 222, indicating a location on the bounding virtual object at which the hand of the user intersects the bounding virtual object. For example, an outline of an area of intersection may be displayed on the surface of the bounding virtual object. In other embodiments, step 220 may further include, at step 224, hiding the bounding virtual object.

FIG. 9C shows steps that may be performed in embodiments in which the virtual object includes an interactable affordance. In such embodiments, the method 200 may further include, at step 226, detecting a gesture of the hand of the user that intersects the interactable affordance. The gesture may be detected based on the imaging data and may include a movement of the hand through the physical environment. At step 228, the method may further include, in response to detecting the gesture that intersects the interactable affordance, conveying a virtual object interaction input to an application program. The application program may be executed at the processor of the head-mounted display system. In some embodiments, the interactable affordance of the virtual object may be indicated on the bounding virtual object in a visually detectable manner. For example, the bounding virtual object may highlight and/or show an enlarged view of the interactable affordance.

As shown in FIG. 9D, the method 200 may further include, at step 230, displaying an animated graphical element on the bounding virtual object. The animated graphical element may be configured to change in visual appearance without user interaction, such as by cycling through a plurality of frames. At step 232, the method 200 may further include modifying the animated graphical element in a visually identifiable manner based on the change in the world-space distance. Similarly to modifications to the bounding virtual object as a whole, the modification to the animated graphical element may include a change in a color, opacity, brightness, or size of the animated graphical element. Additionally or alternatively, the modification to the animated graphical element may pause the animated graphical element, unpause the animated graphical element, or make some other change to the framerate of the animated graphical element.

Figure 10:
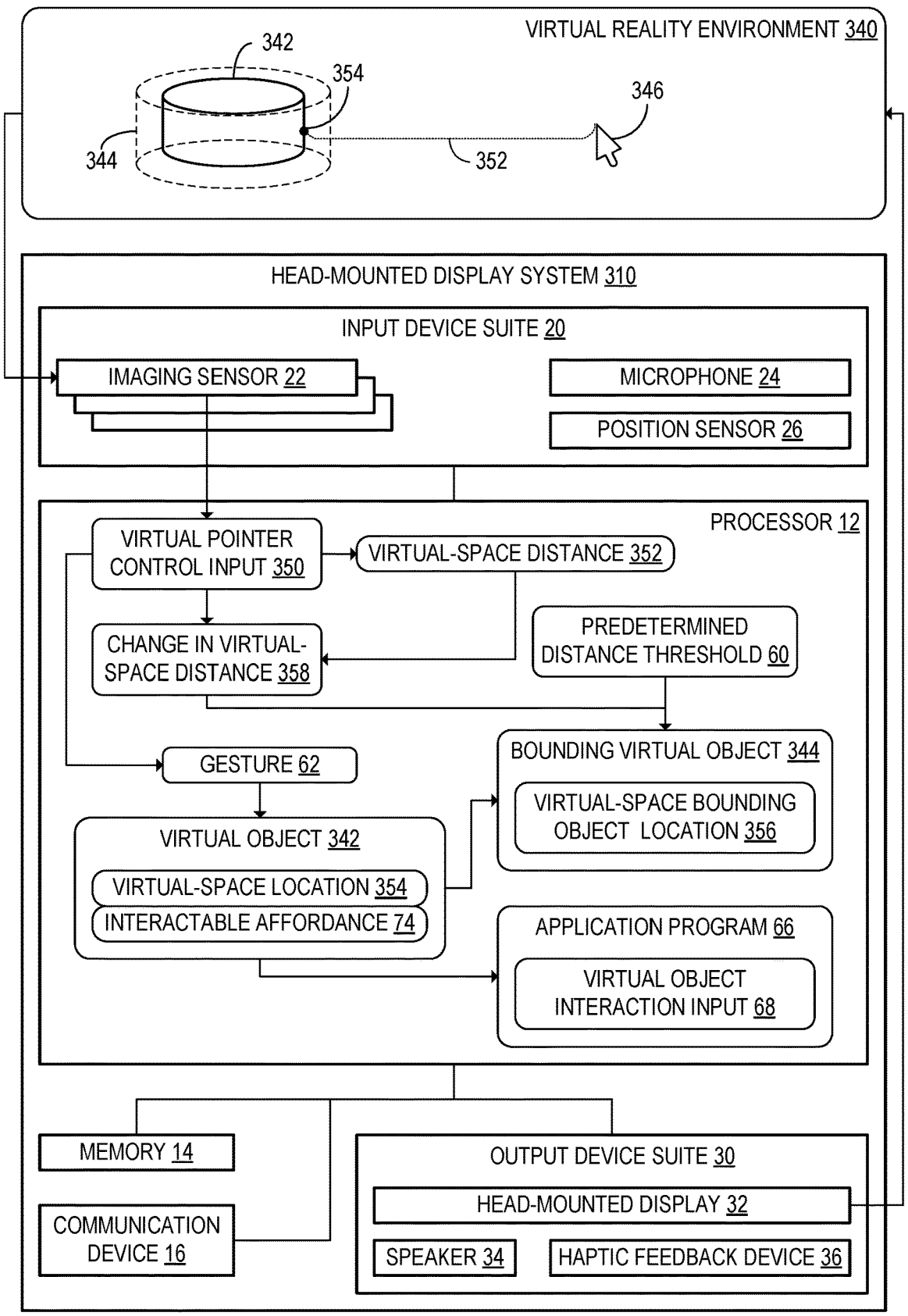
FIG. 10 shows an example head-mounted display system in a virtual reality configuration.

Although the above examples are described with reference to an augmented reality configuration of the head-mounted display system 10, the systems and methods described above may also be used in a virtual reality configuration. FIG. 10 shows an example head-mounted display system 310 in a virtual reality configuration. In the embodiment of FIG. 10, the head-mounted display system 310 includes a head-mounted display 32, a processor 12, and a user input device. As in the augmented reality configuration, the user input device may be an imaging sensor. Alternatively, the user input device may be some other type of user input device such as a microphone, a position sensor, a button, a mouse, a control stick, or a touch-sensitive surface.

The processor 12 may be configured to convey instructions to the head-mounted display 32 to display a virtual object 342 at a virtual-space location 354 in a virtual reality environment 340. A virtual pointer 346 via which a user may interact with the virtual object 342 may also be displayed in the virtual reality environment 340. The processor 12 may be further configured to receive a virtual pointer control input 350 from the user input device. The virtual pointer control input 350 may be an input to move the virtual pointer 346 within the virtual reality environment 340.

Based on the virtual pointer control input 350, the processor 12 may be further configured to determine that a virtual-space distance 352 between the virtual pointer 346 and the virtual-space location 354 of the virtual object 342 is below a predetermined distance threshold 60. In response to this determination, the processor 12 may be further configured to convey instructions to the head-mounted display 32 to display a bounding virtual object 344 that covers at least a portion of the virtual object 342 in a visually detectable manner. For example, the bounding virtual object 344 may surround the entire virtual object 342 or may be positioned at a virtual-space bounding object location 356 between the virtual object 342 and the user's point of view in the virtual reality environment 340.

The processor 12 may be further configured to detect, based on the virtual pointer control input 350, a change in the virtual-space distance 358. In response to this detection, the processor 12 may be further configured to convey instructions to the head-mounted display 32 to modify a visual appearance of the bounding virtual object 344 based on the change in the virtual-space distance 358.

Using the systems and methods described above, the user of a head-mounted display system may more easily and intuitively become aware of the proximity of the user's hand or a virtual pointer to a virtual object with which the user may interact. Thus, the user may be able to more easily and accurately select the virtual object and perform a desired interaction. For example, the systems and methods described above may facilitate use by users who are unfamiliar with the head-mounted display system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
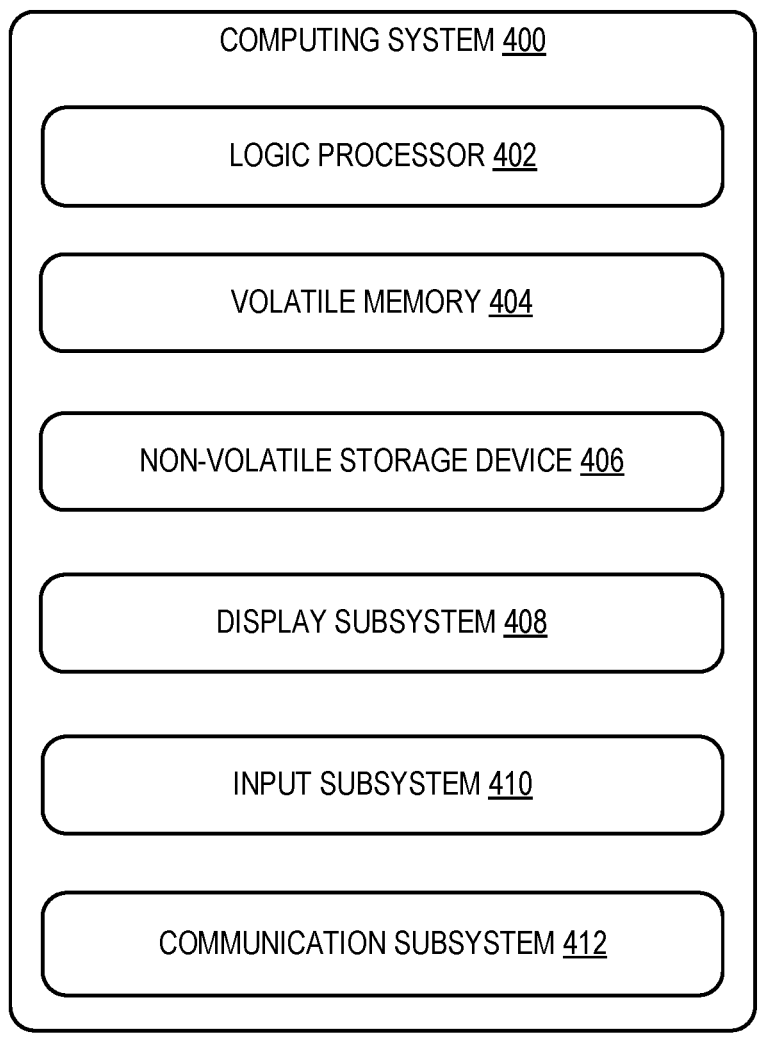
FIG. 11 shows a schematic view of an example computing environment in which the computer device of FIG. 1 may be enacted.

FIG. 11 schematically shows a non-limiting embodiment of a computing system 400 that can enact one or more of the methods and processes described above. Computing system 400 is shown in simplified form. Computing system 400 may embody the head-mounted display system 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 11.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a head-mounted display system is provided, including a head-mounted display, an imaging sensor, and a processor. The processor may be configured to convey instructions to the head-mounted display to display a virtual object at a world-locked location in a physical environment. The processor may be further configured to receive imaging data of the physical environment from the imaging sensor. The processor may be further configured to determine, based on the imaging data, that a world-space distance between a hand of a user and the world-locked location of the virtual object is below a predetermined distance threshold. The processor may be further configured to convey instructions to the head-mounted display to display a bounding virtual object that covers at least a portion of the virtual object in a visually detectable manner. The processor may be further configured to detect, based on the imaging data, a change in the world-space distance. The processor may be further configured to convey instructions to the head-mounted display to modify a visual appearance of the bounding virtual object based on the change in the world-space distance.

According to this aspect, the processor may be configured to modify the visual appearance of the bounding virtual object at least in part by modifying one or more of a color, an opacity, a brightness, or a size of the bounding virtual object.

According to this aspect, the processor may be configured to modify the visual appearance of the bounding virtual object to be more visually prominent in response to a decrease in the world-space distance.

According to this aspect, the processor may be further configured to detect, based on the imaging data, that the hand of the user intersects the bounding virtual object. The processor may be further configured to modify the visual appearance of the bounding virtual object in response to the detection that the hand of the user intersects the bounding virtual object.

According to this aspect, the processor may be configured to modify the bounding virtual object at least in part by indicating a location on the bounding virtual object at which the hand of the user intersects the bounding virtual object.

According to this aspect, the processor may be configured to hide the bounding virtual object in response to detecting that the hand of the user intersects the bounding virtual object.

According to this aspect, the virtual object may include an interactable affordance. The processor may be further configured to, in response to detecting the gesture that intersects the interactable affordance, convey a virtual object interaction input to an application program. The interactable affordance of the virtual object may be indicated on the bounding virtual object in a visually detectable manner.

According to this aspect, an animated graphical element may be displayed on the bounding virtual object. The animated graphical element may be modified in a visually identifiable manner based on the change in the world-space distance.

According to this aspect, the processor may be further configured to convey instructions to the head-mounted display to display a hand bounding virtual object that covers at least a portion of the hand of the user.

According to this aspect, the bounding virtual object may visually indicate a direction from the virtual object toward the hand of the user.

According to another aspect of the present disclosure, a method for use with a head-mounted display system, is provided. The method may include conveying instructions to a head-mounted display to display a virtual object at a world-locked location in a physical environment. The method may further include receiving imaging data of the physical environment from an imaging sensor. The method may further include determining, based on the imaging data, that a world-space distance between a hand of a user and the world-locked location of the virtual object is below a predetermined distance threshold. The method may further include conveying instructions to the head-mounted display to display a bounding virtual object that covers at least a portion of the virtual object in a visually detectable manner. The method may further include detecting, based on the imaging data, a change in the world-space distance. The method may further include conveying instructions to the head-mounted display to modify a visual appearance of the bounding virtual object based on the change in the world-space distance.

According to this aspect, the method may further include modifying the visual appearance of the bounding virtual object at least in part by modifying one or more of a color, an opacity, a brightness, or a size of the bounding virtual object.

According to this aspect, the visual appearance of the bounding virtual object may be modified to be more visually prominent in response to a decrease in the world-space distance.

According to this aspect, the method may further include detecting, based on the imaging data, that the hand of the user intersects the bounding virtual object. The method may further include modifying the visual appearance of the bounding virtual object in response to the detection that the hand of the user intersects the bounding virtual object.

According to this aspect, modifying the bounding virtual object may include indicating a location on the bounding virtual object at which the hand of the user intersects the bounding virtual object.

According to this aspect, the virtual object may include an interactable affordance. The method may further include detecting, based on the imaging data, a gesture of the hand of the user that intersects the interactable affordance. The method may further include, in response to detecting the gesture that intersects the interactable affordance, conveying a virtual object interaction input to an application program. The interactable affordance of the virtual object may be indicated on the bounding virtual object in a visually detectable manner.

According to this aspect, the method may further include displaying an animated graphical element on the bounding virtual object. The method may further include modifying the animated graphical element in a visually identifiable manner based on the change in the world-space distance.

According to this aspect, the method may further include conveying instructions to the head-mounted display to display a hand bounding virtual object that covers at least a portion of the hand of the user.

According to this aspect, the bounding virtual object may visually indicate a direction from the virtual object toward the hand of the user.

According to another aspect of the present disclosure, a head-mounted display system is provided, including a head-mounted display, a user input device, and a processor. The processor may be configured to convey instructions to the head-mounted display to display a virtual object at a virtual-space location in a virtual reality environment. The processor may be further configured to receive a virtual pointer control input from the user input device. The processor may be further configured to determine, based on the virtual pointer control input, that a virtual-space distance between a virtual pointer and the virtual-space location of the virtual object is below a predetermined distance threshold. The processor may be further configured to convey instructions to the head-mounted display to display a bounding virtual object that covers at least a portion of the virtual object in a visually detectable manner. The processor may be further configured to detect, based on the virtual pointer control input, a change in the virtual-space distance. The processor may be further configured to convey instructions to the head-mounted display to modify a visual appearance of the bounding virtual object based on the change in the virtual-space distance.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display system comprising:
a head-mounted display;
an imaging sensor; and
a processor configured to:
   convey instructions to the head-mounted display to display a virtual object at a world-locked location in a physical environment, wherein the virtual object includes an interactable affordance, the interactable affordance including a graphical element indicated on a bounding virtual object in a visually detectable manner;
   receive imaging data of the physical environment from the imaging sensor;
   determine, based on the imaging data, that a world-space distance between a hand of a user and the world-locked location of the virtual object is below a predetermined distance threshold;
   convey instructions to the head-mounted display to display the bounding virtual object such that the bounding virtual object covers at least a portion of the virtual object;
   detect, based on the imaging data, a change in the world-space distance; and
   convey instructions to the head-mounted display to modify a visual appearance of the bounding virtual object based on the change in the world-space distance.

2. The head-mounted display system of claim 1, wherein the processor is configured to modify the visual appearance of the bounding virtual object at least in part by modifying one or more of a color, an opacity, a brightness, or a size of the bounding virtual object.

3. The head-mounted display system of claim 2, wherein the processor is configured to modify the visual appearance of the bounding virtual object to be more visually prominent in response to a decrease in the world-space distance.

4. The head-mounted display system of claim 1, wherein the processor is further configured to:
   detect, based on the imaging data, that the hand of the user intersects the bounding virtual object; and
   modify the visual appearance of the bounding virtual object in response to the detection that the hand of the user intersects the bounding virtual object.

5. The head-mounted display system of claim 4, wherein the processor is configured to modify the bounding virtual object at least in part by indicating a location on the bounding virtual object at which the hand of the user intersects the bounding virtual object.

6. The head-mounted display system of claim 4, wherein the processor is configured to hide the bounding virtual object in response to detecting that the hand of the user intersects the bounding virtual object.

7. The head-mounted display system of claim 1, wherein:
the processor is further configured to:
   detect, based on the imaging data, a gesture of the hand of the user that intersects the interactable affordance; and
   in response to detecting the gesture that intersects the interactable affordance, convey a virtual object interaction input to an application program.

8. The head-mounted display system of claim 1, wherein:
an animated graphical element is displayed on the bounding virtual object; and
the animated graphical element is modified in a visually identifiable manner based on the change in the world-space distance.

9. The head-mounted display system of claim 1, wherein the processor is further configured to convey instructions to the head-mounted display to display a hand bounding virtual object that covers at least a portion of the hand of the user.

10. The head-mounted display system of claim 1, wherein the bounding virtual object visually indicates a direction from the virtual object toward the hand of the user.

11. A method for use with a head-mounted display system, the method comprising:
   conveying instructions to a head-mounted display to display a virtual object at a world-locked location in a physical environment, wherein the virtual object includes an interactable affordance, the interactable affordance including a graphical element indicated on a bounding virtual object in a visually detectable manner;
   receiving imaging data of the physical environment from an imaging sensor;
   determining, based on the imaging data, that a world-space distance between a hand of a user and the world-locked location of the virtual object is below a predetermined distance threshold;
   conveying instructions to the head-mounted display to display the bounding virtual object such that the bounding virtual object covers at least a portion of the virtual object;
   detecting, based on the imaging data, a change in the world-space distance; and
   conveying instructions to the head-mounted display to modify a visual appearance of the bounding virtual object based on the change in the world-space distance.

12. The method of claim 11, further comprising modifying the visual appearance of the bounding virtual object at least in part by modifying one or more of a color, an opacity, a brightness, or a size of the bounding virtual object.

13. The method of claim 12, wherein the visual appearance of the bounding virtual object is modified to be more visually prominent in response to a decrease in the world-space distance.

14. The method of claim 11, further comprising:
   detecting, based on the imaging data, that the hand of the user intersects the bounding virtual object; and
   modifying the visual appearance of the bounding virtual object in response to the detection that the hand of the user intersects the bounding virtual object.

15. The method of claim 14, wherein modifying the bounding virtual object includes indicating a location on the bounding virtual object at which the hand of the user intersects the bounding virtual object.

16. The method of claim 11, further comprising:
   detecting, based on the imaging data, a gesture of the hand of the user that intersects the interactable affordance; and
   in response to detecting the gesture that intersects the interactable affordance, conveying a virtual object interaction input to an application program.

17. The method of claim 11, further comprising:
   displaying an animated graphical element on the bounding virtual object; and
   modifying the animated graphical element in a visually identifiable manner based on the change in the world-space distance.

18. The method of claim 11, further comprising conveying instructions to the head-mounted display to display a hand bounding virtual object that covers at least a portion of the hand of the user.

19. The method of claim 11, wherein the bounding virtual object visually indicates a direction from the virtual object toward the hand of the user.

20. A head-mounted display system comprising:
- a head-mounted display;
- a user input device; and
- a processor configured to:
  - convey instructions to the head-mounted display to display a virtual object at a virtual-space location in a virtual reality environment, wherein the virtual object includes an interactable affordance, the interactable affordance including a graphical element indicated on a bounding virtual object in a visually detectable manner;
  - receive a virtual pointer control input from the user input device;
  - determine, based on the virtual pointer control input, that a virtual-space distance between a virtual pointer and the virtual-space location of the virtual object is below a predetermined distance threshold;
  - convey instructions to the head-mounted display to display the bounding virtual object such that the bounding virtual object covers at least a portion of the virtual object;
  - detect, based on the virtual pointer control input, a change in the virtual-space distance; and
  - convey instructions to the head-mounted display to modify a visual appearance of the bounding virtual object based on the change in the virtual-space distance.

* * * * *